US006262948B1

United States Patent
Watanabe et al.

(10) Patent No.: US 6,262,948 B1
(45) Date of Patent: *Jul. 17, 2001

(54) OPTICAL DISK HAVING A PROTECTIVE LAYER SPECIFIED THICKNESS RELATIVE TO THE NA OF AN OBJECTIVE LENS AND THE WAVELENGTH OF LIGHT SOURCE

(75) Inventors: Tetsu Watanabe; Yoshio Aoki, both of Tokyo (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,830

(22) Filed: May 21, 1998

Related U.S. Application Data

(63) Continuation of application No. 09/082,830, filed on May 21, 1998, which is a continuation of application No. 08/818,552, filed on Mar. 14, 1997, now Pat. No. 5,838,646, which is a continuation-in-part of application No. 08/613,035, filed on Mar. 8, 1996, now Pat. No. 5,757,733, which is a continuation of application No. 08/383,351, filed on Feb. 3, 1995, now Pat. No. 5,533,001, which is a division of application No. 08/277,357, filed on Jul. 19, 1994, now Pat. No. 5,392,263, which is a continuation of application No. 07/761,874, filed on Sep. 13, 1991, now abandoned.

(51) Int. Cl.[7] .................................................... G11B 11/00
(52) U.S. Cl. ..................................................................... 369/13
(58) Field of Search ......................... 369/275.5, 275.2, 369/13, 14, 283, 284; 428/64.4

(56) References Cited

U.S. PATENT DOCUMENTS

| | | | |
|---|---|---|---|
| 4,449,138 | 5/1984 | Ando | 346/135.1 |
| 4,807,204 | * 2/1989 | Mizutani et al. | 369/13 |
| 4,922,454 | * 5/1990 | Taki | 365/122 |
| 4,926,403 | * 5/1990 | Tsuyuguchi et al. | 369/13 |
| 5,255,260 | 10/1993 | Yamada et al. | 369/199 |
| 5,287,334 | * 2/1994 | Iwabuchi et al. | 369/13 |
| 5,479,382 | * 12/1995 | Nishida et al. | 369/13 |

FOREIGN PATENT DOCUMENTS

| | | |
|---|---|---|
| 0424809 | 10/1890 | (EP) . |
| 0341829 | 4/1989 | (EP) . |
| 1251376 | 10/1989 | (JP) . |

* cited by examiner

*Primary Examiner*—Tan Dinh
(74) *Attorney, Agent, or Firm*—Jay H. Maioli

(57) ABSTRACT

An optical disc system uses an optical disc with a light-transmitting cover and an objective lens for bundling or focusing a light beam on a recording layer of the optical disc in order to perform recording and/or reproducing of information. The thickness of the light-transmitting cover falls within the range of 0.05 mm to 0.6 mm, the numerical aperture (NA) of the objective lens is set to fall within the range of 0.55 to 1.10, and the wavelength of the light beam is selected to be between 100 nm to 780 nm.

18 Claims, 5 Drawing Sheets

| NA | | 0.55 | 0.6 | 0.65 | 0.7 | 0.75 | 0.8 | 0.85 | 0.9 | 0.95 | 1 | 1.05 | 1.1 | 1.15 |
|---|---|---|---|---|---|---|---|---|---|---|---|---|---|---|
| λ | (nm) | 780 | 780 | 780 | 780 | 780 | 780 | 780 | 780 | 780 | 780 | 780 | 780 | 780 |
| t | (mm) | 0.902 | 0.694 | 0.546 | 0.437 | 0.356 | 0.293 | 0.244 | 0.206 | 0.175 | 0.150 | 0.130 | 0.113 | 0.099 |

| NA | | 0.55 | 0.6 | 0.65 | 0.7 | 0.75 | 0.8 | 0.85 | 0.9 | 0.95 | 1 | 1.05 | 1.1 | 1.15 |
|---|---|---|---|---|---|---|---|---|---|---|---|---|---|---|
| λ | (nm) | 500 | 500 | 500 | 500 | 500 | 500 | 500 | 500 | 500 | 500 | 500 | 500 | 500 |
| t | (mm) | 0.578 | 0.445 | 0.350 | 0.280 | 0.228 | 0.188 | 0.157 | 0.132 | 0.112 | 0.096 | 0.083 | 0.072 | 0.063 |

| NA | | 0.55 | 0.6 | 0.65 | 0.7 | 0.75 | 0.8 | 0.85 | 0.9 | 0.95 | 1 | 1.05 | 1.1 | 1.15 |
|---|---|---|---|---|---|---|---|---|---|---|---|---|---|---|
| λ | (nm) | 400 | 400 | 400 | 400 | 400 | 400 | 400 | 400 | 400 | 400 | 400 | 400 | 400 |
| t | (mm) | 0.462 | 0.356 | 0.280 | 0.224 | 0.182 | 0.150 | 0.125 | 0.106 | 0.090 | 0.077 | 0.066 | 0.058 | 0.051 |

| NA | | 0.55 | 0.6 | 0.65 | 0.7 | 0.75 | 0.8 | 0.85 | 0.9 | 0.95 | 1 | 1.05 |
|---|---|---|---|---|---|---|---|---|---|---|---|---|
| λ | (nm) | 300 | 300 | 300 | 300 | 300 | 300 | 300 | 300 | 300 | 300 | 300 |
| t | (mm) | 0.347 | 0.267 | 0.210 | 0.168 | 0.137 | 0.113 | 0.094 | 0.079 | 0.067 | 0.058 | 0.050 |

| NA | | 0.55 | 0.6 | 0.65 | 0.7 | 0.75 | 0.8 | 0.85 | 0.9 |
|---|---|---|---|---|---|---|---|---|---|
| λ | (nm) | 200 | 200 | 200 | 200 | 200 | 200 | 200 | 200 |
| t | (mm) | 0.231 | 0.178 | 0.140 | 0.112 | 0.091 | 0.075 | 0.063 | 0.053 |

| NA | | 0.55 | 0.6 | 0.65 | 0.7 | 0.75 | 0.8 |
|---|---|---|---|---|---|---|---|
| λ | (nm) | 150 | 150 | 150 | 150 | 150 | 150 |
| t | (mm) | 0.173 | 0.134 | 0.105 | 0.084 | 0.068 | 0.056 |

| NA | | 0.55 | 0.6 | 0.65 | 0.7 | 0.75 |
|---|---|---|---|---|---|---|
| λ | (nm) | 100 | 100 | 100 | 100 | 100 |
| t | (mm) | 0.12 | 0.09 | 0.07 | 0.06 | 0.05 |

| NA | 0.55 | 0.6 | 0.65 | 0.7 | 0.75 | 0.8 | 0.85 | 0.9 | 0.95 | 1 | 1.05 | 1.1 | 1.15 |
|---|---|---|---|---|---|---|---|---|---|---|---|---|---|
| λ (nm) | 780 | 780 | 780 | 780 | 780 | 780 | 780 | 780 | 780 | 780 | 780 | 780 | 780 |
| t (mm) | 0.902 | 0.694 | 0.546 | 0.437 | 0.356 | 0.293 | 0.244 | 0.206 | 0.175 | 0.150 | 0.130 | 0.113 | 0.099 |

| NA | 0.55 | 0.6 | 0.65 | 0.7 | 0.75 | 0.8 | 0.85 | 0.9 | 0.95 | 1 | 1.05 | 1.1 | 1.15 |
|---|---|---|---|---|---|---|---|---|---|---|---|---|---|
| λ (nm) | 500 | 500 | 500 | 500 | 500 | 500 | 500 | 500 | 500 | 500 | 500 | 500 | 500 |
| t (mm) | 0.578 | 0.445 | 0.350 | 0.280 | 0.228 | 0.188 | 0.157 | 0.132 | 0.112 | 0.096 | 0.083 | 0.072 | 0.063 |

| NA | 0.55 | 0.6 | 0.65 | 0.7 | 0.75 | 0.8 | 0.85 | 0.9 | 0.95 | 1 | 1.05 | 1.15 |
|---|---|---|---|---|---|---|---|---|---|---|---|---|
| λ (nm) | 400 | 400 | 400 | 400 | 400 | 400 | 400 | 400 | 400 | 400 | 400 | 400 |
| t (mm) | 0.462 | 0.356 | 0.280 | 0.224 | 0.182 | 0.150 | 0.125 | 0.106 | 0.090 | 0.077 | 0.066 | 0.058 | 0.051 |

| NA | 0.55 | 0.6 | 0.65 | 0.7 | 0.75 | 0.8 | 0.85 | 0.9 | 0.95 | 1 | 1.05 |
|---|---|---|---|---|---|---|---|---|---|---|---|
| λ (nm) | 300 | 300 | 300 | 300 | 300 | 300 | 300 | 300 | 300 | 300 | 300 |
| t (mm) | 0.347 | 0.267 | 0.210 | 0.168 | 0.137 | 0.113 | 0.094 | 0.079 | 0.067 | 0.058 | 0.050 |

| NA | 0.55 | 0.6 | 0.65 | 0.7 | 0.75 | 0.8 | 0.85 | 0.9 |
|---|---|---|---|---|---|---|---|---|
| λ (nm) | 200 | 200 | 200 | 200 | 200 | 200 | 200 | 200 |
| t (mm) | 0.231 | 0.178 | 0.140 | 0.112 | 0.091 | 0.075 | 0.063 | 0.053 |

| NA | 0.55 | 0.6 | 0.65 | 0.7 | 0.75 | 0.8 |
|---|---|---|---|---|---|---|
| λ (nm) | 150 | 150 | 150 | 150 | 150 | 150 |
| t (mm) | 0.173 | 0.134 | 0.105 | 0.084 | 0.068 | 0.056 |

| NA | 0.55 | 0.6 | 0.65 | 0.7 | 0.75 |
|---|---|---|---|---|---|
| λ (nm) | 100 | 100 | 100 | 100 | 100 |
| t (mm) | 0.12 | 0.09 | 0.07 | 0.06 | 0.05 |

FIG. 5

OPTICAL DISK HAVING A PROTECTIVE LAYER SPECIFIED THICKNESS RELATIVE TO THE NA OF AN OBJECTIVE LENS AND THE WAVELENGTH OF LIGHT SOURCE

CROSS REFERENCE TO RELATED APPLICATIONS

This application is a continuation of Ser. No. 09/082,830 filed May 21, 1998, which is a continuation of Ser. No. 08/818,552 filed Mar. 14, 1997, now U.S. Pat. No. 5,838,646, which is a continuation-in-part of application Ser. No. 08/613,035 filed Mar. 8, 1996, now U.S. Pat. No. 5,757,733, which is a continuation of application Ser. No. 08/383,351 filed Feb. 3, 1995, now U.S. Pat. No. 5,533,001, which is a division of Ser. No. 08/277,357 filed Jul. 19, 1994, now U.S. Pat. No. 5,392,263, which is a continuation of application Ser. No. 07/761,874 filed Sep. 13, 1991, now abandoned.

TECHNICAL FIELD

The present invention relates to optical disc systems for performing recording and/or reproduction of information signals, and optical discs used in these systems.

BACKGROUND ART

An optical disc system is shown in FIG. 1 as a system for performing recording on and/or reproduction from an optical recording medium such as an optical disc.

A conventional optical disc system, such as that shown in FIG. 1, is arranged such that when a one-sided dis-like optical recording medium 50 is mounted therein, an optical system including a laser unit 58 and an objective lens 59 are arranged above the one-sided optical recording medium 50. The numerical aperture (referred to herein as NA) of the objective lens 59 has a value ranging from 0.50 to 0.53.

In order to drive the optical system in focusing and tracking directions with respect to the optical recording medium 50, a drive system (not shown) is provided.

The one-sided optical recording medium 50 is formed as follows. A recording layer 55 and a protective cover 56 are sequentially stacked on one surface of a light-transmitting transparent substrate 51 made of polycarbonate, for example. The light-transmitting transparent substrate 51 has a predetermined thickness $t_1$. The thickness of a conventional substrate is typically 1.2 mm.

An operation of the conventional optical disc system is described below.

The one-sided optical recording medium 50 is placed on and driven by a rotary table (not shown). A laser beam emitted from the laser unit 58 is focused through the objective lens 59 onto the recording layer 55. A change in intensity of the focused laser beam in accordance with the data to be recorded produces pits in the recording layer 55.

In order to cope with an increase in information volume, the quantity of information signals recorded in the recording layer of an optical disc must be increased. To date, however, dimensional constraints on the optical disc and other constraints on the lens and light source prevent such increases in information volume.

One option that has been proposed is to use a two-sided optical recording medium, in which recording layers are formed respectively on both surfaces of a single optical recording medium so that information signals may be recorded on each of the surfaces.

DISCLOSURE OF INVENTION

It is, therefore, an object of the present invention to provide a large-capacity optical disc system for performing high-density recording and/or reproduction, and an optical disc used in such an optical disc system.

According to an aspect of the present invention, there is provided an optical disc system for recording an information signal on an optical disc and/or reproducing the information signal from the optical disc. The optical disc is provided with a recording layer irradiated with a light beam to perform recording or reproduction and a light-transmitting cover formed to cover the recording layer and through which the light beam is transmitted. The optical disc system comprises light beam generating means for generating the light beam and an objective lens for bundling or focusing the laser beam onto the recording layer through the light-transmitting cover. The thickness of the light-transmitting cover of the optical disc ranges from about 0.05 mm to 0.6 mm, and the numerical aperture of the objective lens ranges from about 0.55 to 1.10.

In systems using the optical disc of the present invention the numerical aperture NA of the objective lens for performing high-density recording or reproduction has a value that falls within the range of 0.55 to 1.10. Therefore, when the thickness of the light-transmitting cover of the disc, formed to cover the recording layer and transmit the light beam to the recording layer, has a value that falls within the range of 0.05 mm to 0.6 mm, optical recording media for performing high-density recording or reproduction can be realized.

The optical disc may have respective recording layers on both sides of the substrate. Such an optical disc having respective recording layers on both sides of the disc can be used in an optical disc system of the present invention. In this system, a pair of optical pickup units, each having a light beam generating means and an objective lens, are arranged on opposite sides of an optical disc so as to face each other.

The optical disc having a recording layer on each of its surfaces, and the optical disc system using such a double-sided optical disc, enables higher-capacity recording and reproduction.

According to yet another aspect of the present invention, there is provided an optical disc system for recording an information signal on an optical disc and/or reproducing an information signal from the optical disc. The optical disc includes a substrate, an optical recording layer formed on the substrate and irradiated with a light beam for recording or reproduction, and a light-transmitting cover formed to cover the optical recording layer and through which the light beam is transmitted. The optical recording layer is formed to have land and groove regions which are used to facilitate tracking of the light beam on the optical recording layer. Unlike conventional optical recording discs which record information on only the land regions or only the groove regions and uses the other regions for tracking, the optical disc according to the present invention records information on both the land regions and the groove regions and uses the transition regions between the land and groove regions for tracking. Accordingly, the recording density of such an optical disc is increased. The optical recording system comprises laser beam generating means for generating the light beam and an objective lens for focusing the light beam onto the optical recording layer through the light-transmitting cover. The light-transmitting cover of the optical disc has a thickness that falls within the range of about 0.05 mm to 0.6 mm, and the numerical aperture of the objective lens has a value that falls within the range of about 0.55 to 1.10.

When the light beam is bundled or focused by the objective lens, the convergent rays have a minimum diameter given by:

$$2\omega_0 = 0.82 \times \lambda / NA \quad (1)$$

where λ is the wavelength of the light beam.

Since the numerical aperture NA of the objective lens has a value that is larger than the conventional NA, which ranges from 0.50 to 0.53, the minimum diameter of the convergent rays is decreased and the recording density is increased accordingly. Therefore, reproduction of a high-density recording can be performed.

As the NA of the objective lens is increased, the thickness of the objective lens increases. However, the thickness of the light-transmitting cover of the disc is smaller than the conventional thickness (1.2 mm). As a result, the objective lens having a larger thickness will not be brought into contact with the optical disc.

As the NA of the objective lens and the thickness t of the light-transmitting cover of the optical disc is changed, the aberration values of the objective lens are changed according to:

(A) spherical aberration $W_{40}$ $$W_{40} = \frac{t}{8} \cdot \frac{N^2 - 1}{N^3} \cdot \sin^4 \alpha \quad (2)$$

where sinα is the NA, and N is the refractive index of the light-transmitting cover of the disc, and (B) coma $W_{31}$ $$W_{31}\alpha \frac{t}{2} \cdot \frac{(N^2 - 1)N^2 \sin\Theta \cos\Theta}{(N^2 - \sin^2\Theta)^{5/2}} \cdot \sin^3 \alpha \quad (3)$$

where t is the thickness of the light-transmitting cover, N is the refractive index of the light-transmitting cover of the disc, and θ is the skew.

The relationship between wavelength λ of the light beam and the coma $W_{31}$ is:

$$W_{31} = (\text{abberation limit}) \cdot \lambda \quad (4)$$

and the relationship between t, λ, and NA is:

$$\frac{t_1 NA_1^3}{\lambda_1} = \frac{t_2 NA_2^3}{\lambda_2} \quad (5)$$

for a constant coma $W_{31}$. The relationship between t, λ, when λ is within a range from 100 nm to 780 nm, and NA is shown in the table of FIG. 5.

The spherical aberration (A) can be corrected by the objective lens and does not pose an insurmountable problem. However, if the thickness t of the light-transmitting cover is dispersive, problems may arise. Therefore, the thickness t is preferable set to fall within the tolerance given by the above equations.

The coma (B) cannot be corrected by the objective lens. It is preferable to make the absolute value of the coma as small as possible. However, even if the numerical aperture NA increases, the thickness t of the light-transmitting cover decreases, so that absolute value of the coma $W_{31}$ generally does not become large.

For the above reasons, the aberrations of the objective lens do not pose insurmountable problems even when the numerical aperture NA is increased. According to the optical disc system described above, recording and/or reproduction can thus be performed at a higher density that of a conventional system.

BRIEF DESCRIPTION OF DRAWINGS

FIG. 5 is a table showing the relationship between t (mm), λ (mm), and NA.

BEST MODE OF CARRYING OUT THE INVENTION

The first to fourth embodiments of this invention will be described with reference to FIGS. 2 to 5.

Figure 2:
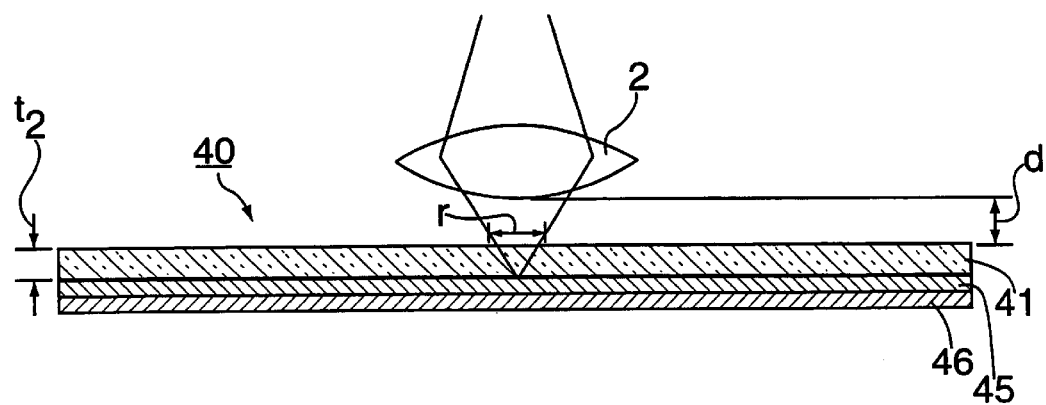
FIG. 2 is a sectional view showing an arrangement of an optical disc system according to a first embodiment of the present invention.

FIG. 2 is a sectional view showing the first embodiment in which the present invention is applied to an optical disc system. FIG. 2 shows the basic arrangement of this optical disc system.

Figure 1:
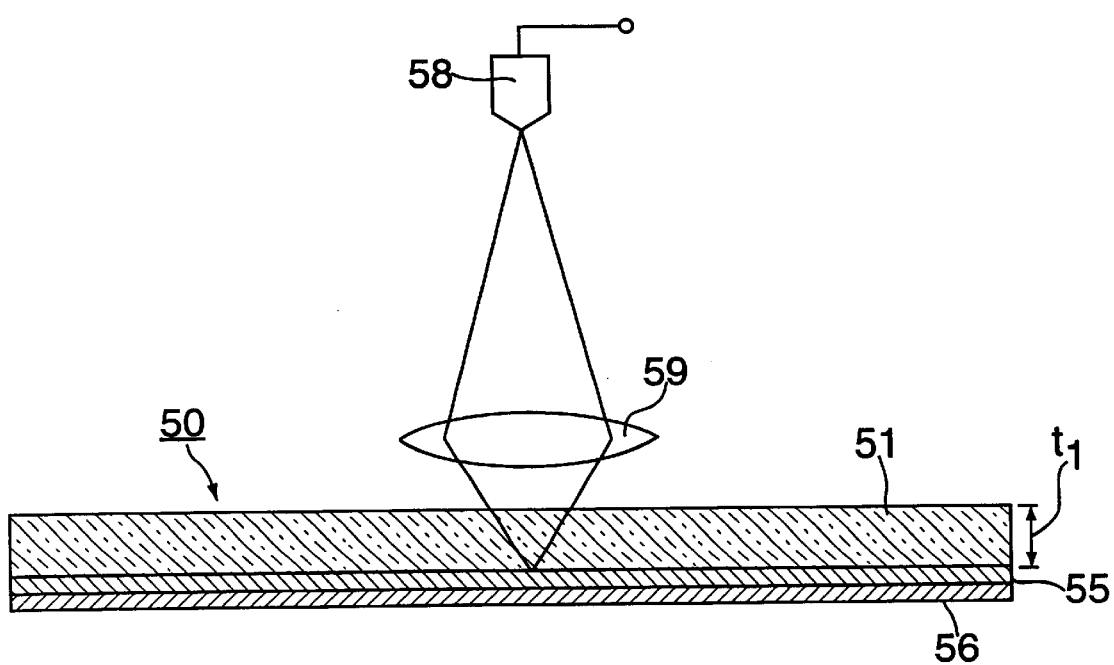
FIG. 1 is a sectional view showing a basic arrangement of a conventional optical disc system.

As shown in FIG. 2, this optical disc system comprises an objective lens 2 having an NA of 0.55 to 1.10. This optical disc system is arranged to perform recording and reproduction by radiating a laser beam of the laser beam unit onto a disc-like one-sided optical recording medium 40, which is produced by sequentially stacking a recording layer 45 and a protective cover 46 on a thin light-transmitting substrate 41 having a thickness $t_2$ of 0.05 mm to 0.6 mm. which is smaller than that of the conventional substrate shown in FIG. 1.

The objective lens 2 is bonded and fixed to a bobbin (not shown) to form an integrated structure.

Recording on and reproduction from double-sided optical recording media can be performed as will be described in the second and third embodiments.

In an optical recording medium used with the above-described optical disc system, for example, a 3.5" optical disc may be used as a hard disc, or the disc may be housed in a cartridge.

When the NA of the objective lens 2 is increased to fall within the range of 0.55 to 1.10, its focal depth (equal to λ/NA², where λ is the wavelength of the laser beam falling within a range from 100 nm to 780 nm) becomes small. Since the optical disc is made to be small, as described above, an actuator (not shown) constituting a drive system for the optical pickup can be made to properly perform tracking control of the optical pickup, the fact that the focal depth is small poses no problems.

The spherical aberration $W_{40}$ is corrected by the objective lens 2. As for the coma $W_{31}$, even if the NA of the objective lens is increased as described above, no problems are raised because the thickness $t_2$ of the light transmitting substrate is small.

The relationship between numerical aperture NA and thickness t for a constant coma $W_{31}$ equivalent to the coma $W_{31}$, when the NA of the objective lens is 0.5 and the thickness t of the light-transmitting substrate (light-transmitting cover) is 1.2 mm is shown in Table 1.

TABLE 1

| NA | 0.50 | 0.55 | 0.60 | 0.65 | 0.70 |
|---|---|---|---|---|---|
| t (mm) | 1.20 | 0.90 | 0.69 | 0.55 | 0.44 |

According to Table 1, if the thickness t is set to fall within the range of 0.1 mm to 0.6 mm when the NA falls within the range of 0.55 to 0.70, the coma can be suppressed to a level equal to or lower than that for a conventional case, so no problem arises.

Similarly, the table of FIG. 5 shows the relationship between t, λ, when λ is within a range from 100 nm to 780 nm, and NA, given by equation (5) above, for a constant coma $W_{31}$.

As the NA of the objective lens 2 increases, the thickness of the objective lens 2 increases. However, since the thickness $t_2$ of the transparent substrate is small, the distance d (working distance) between the objective lens 2 and the optical recording medium 40, as shown in FIG. 2 increases by more than a predetermined value. The objective lens 2 is not brought into contact with the optical recording medium 40.

The perplexing problem of the dust in an optical disc system can be eliminated when a cartridge or hard disc medium is employed as the optical recording medium.

The grain size and distribution of dust are important factors to consider in the performance of the optical disc system. A radius r (shown in FIG. 2) of a spot formed when a laser beam is projected onto the transparent substrate 41 is given as follows:

$$r = t \cdot \tan(\arcsin(NA/N)). \quad (6)$$

As is apparent from equation (6), when the thickness t of the light-transmitting cover is decreased, the radius r is also decreased. However, the NA is large so the radius r cannot be greatly decreased. Therefore, no dust problem is posed in this embodiment.

As described above, in the optical disc system of this embodiment, the NA of the objective lens is set to fall within the range of 0.55 to 1.10 and, at the same time, the thickness $t_2$ of the light transmitting substrate (light transmitting cover) is set to fall within the range of 0.05 mm to 0.6 mm, so that the recording density can be increased $(0.55/0.50)^2$ to $(1.10/0.50)^2$ times, nearly 1.2 to 4.8 times larger than that of the conventional system in which an objective lens having an NA of 0.50 is used, as is apparent from equation (1). Thus, all of the above-mentioned various problems caused by an increase in the NA of the objective lens apparently can be solved. Therefore, a large storage capacity optical disc system can be obtained without posing any problems.

The detailed arrangements of the optical disc system of the first embodiment will be adapted to the second and third embodiments below.

Figure 3:
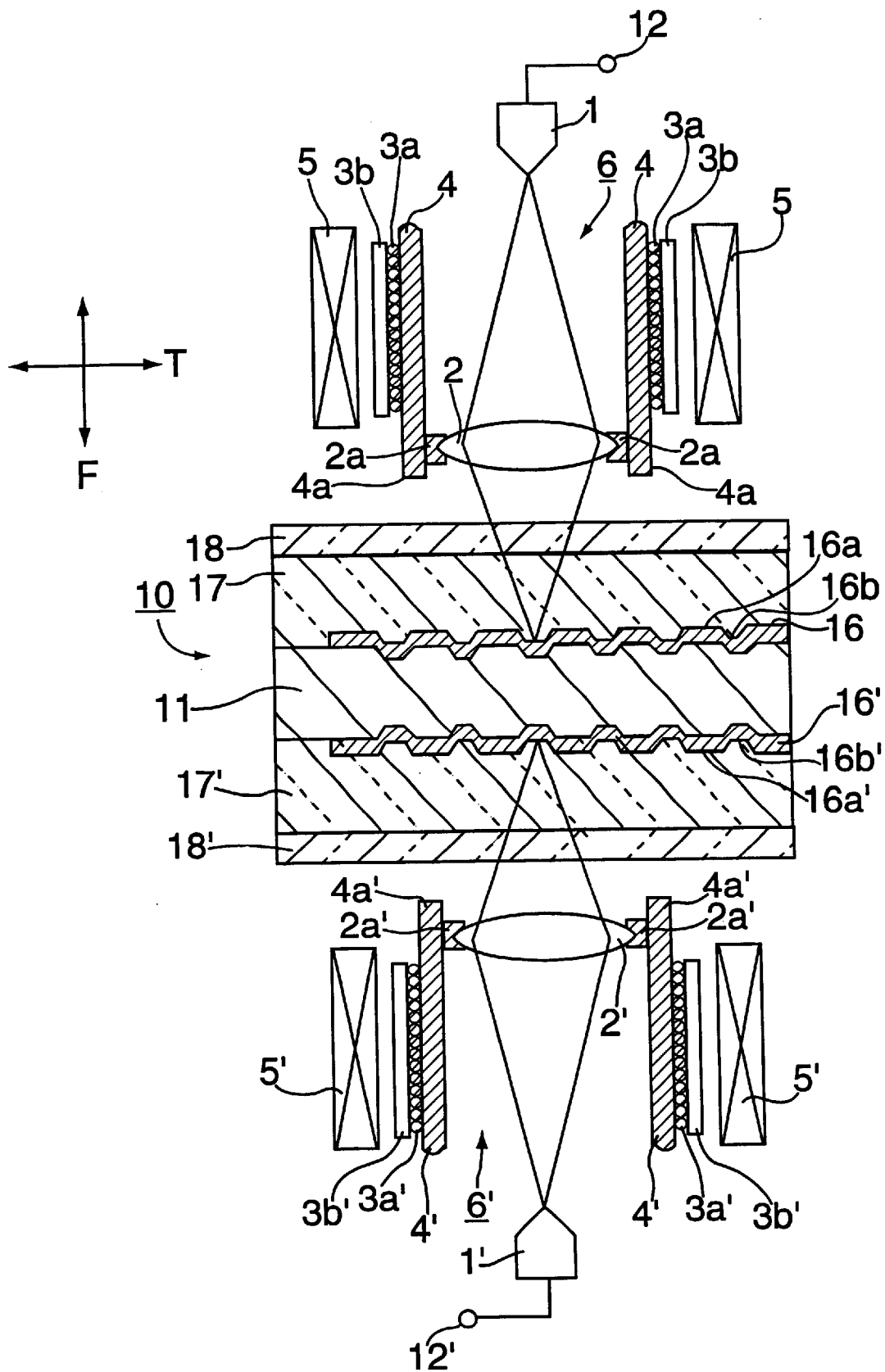
FIG. 3 is a sectional view showing an arrangement of an optical disc system according to a second embodiment of the present invention.

FIG. 3 is a sectional view of an optical disc system according to the second embodiment of the present invention.

In the second embodiment, first and second optical pickup units are arranged on opposite sides of an optical recording medium 10 so as to face each other as shown on FIG. 3.

The first optical pickup unit located above the optical recording medium 10 and the second optical pickup unit located below the optical recording medium 10 are substantially the same as described below, and therefore reference numeral 1 corresponds to reference numeral 1'.

Each if the first and second optical pickup units of FIG. 3 comprises a pickup that is an optical system and has a laser unit 1, 1', an objective lens 2, 2' having an NA of 0.55 to 1.10, a bobbin 4, 4' on which a focus coil 3a, 3a' an a tracking coil 3b, 3b' are wound, and a magnet 5, 5' surrounding the bobbin 4, 4'.

The bobbin 4, 4' of the pickup 6, 6' is of cylindrical shape, and on the bobbin 4, 4' are wound the focus coil 3a, 3a' for driving the pickup 6, 6' in a direction of double-headed arrow F in FIG. 3, and the tracking coil 3b, 3b' for driving the pickup 6, 6' in a direction of a double-headed arrow T in FIG. 3. Lens support members 2a and 2a' are arranged adjacent to end portions 4a and 4b' of the coil bobbins 4 and 4', respectively. The objective lenses 2 and 2' for focusing the laser beams emitted from the laser units 1 and 1' are supported by the lens support members 2a and 2a', respectively.

The two-sided optical recording medium 10 shown in FIG. 3 is the one proposed in the specification and drawings of Japanese Patent Application No. 1-142563 filed by the present applicant. Recording portions 16, photo-curable resin layers 17, and transparent protective plates 18 are formed respectively on both surfaces of a single substrate 11. Both the transparent protective plates 18 and the photo-curable resin layers 17 have light-transmitting properties and a total thickness thereof can be less than 0.6 mm.

In this double-sided optical recording medium 10, the single substrate 11 is used in common so that the thickness of the recording medium can be substantially halved as compared with a conventional double-sided optical recording medium, in which two substrates are stuck together.

The function of the optical disc system of FIGS. 3 will be described below.

In the first optical pickup unit, as current is supplied to the focus coil 3a, the coil bobbin 4 is driven to move along the optical axis of the objective lens 2, that is, in the direction of arrow F in FIG. 3. When current is supplied to the tracking coil 3b, the coil bobbin 4 is driven to move in a direction perpendicular to the optical axis of the objective lens 2, as indicated by arrow T in FIG. 3.

Similarly, the second optical pickup unit is driven to move in the direction of arrows F and T synchronously with the movement of the first optical pickup unit.

The laser beams emitted from the laser units 1 and 1' are focused on areas of the recording layers 16 and 16' through the objective lenses 2 and 2'.

According to the second embodiment, recording to or reproduction from the double-sided optical recording medium 10 can be performed in various manners. For example, if the laser units 1 and 1' are simultaneously used, simultaneous recordings in the respective upper and lower recording layers of the double-sided optical recording medium 10. can be performed. Also, when the laser units 1 and 1' are simultaneously used, simultaneous reproduction can be performed. A large storage capacity recording medium can thus be obtained, and high-speed recording and reproduction of information signals can be achieved.

Also, sequential recording to or reproduction from each recording layer of the double-sided optical recording medium 10 can be performed. The capacity of recording and reproduction can be greatly increased as compared with that for a one-sided optical recording medium.

Figure 4:
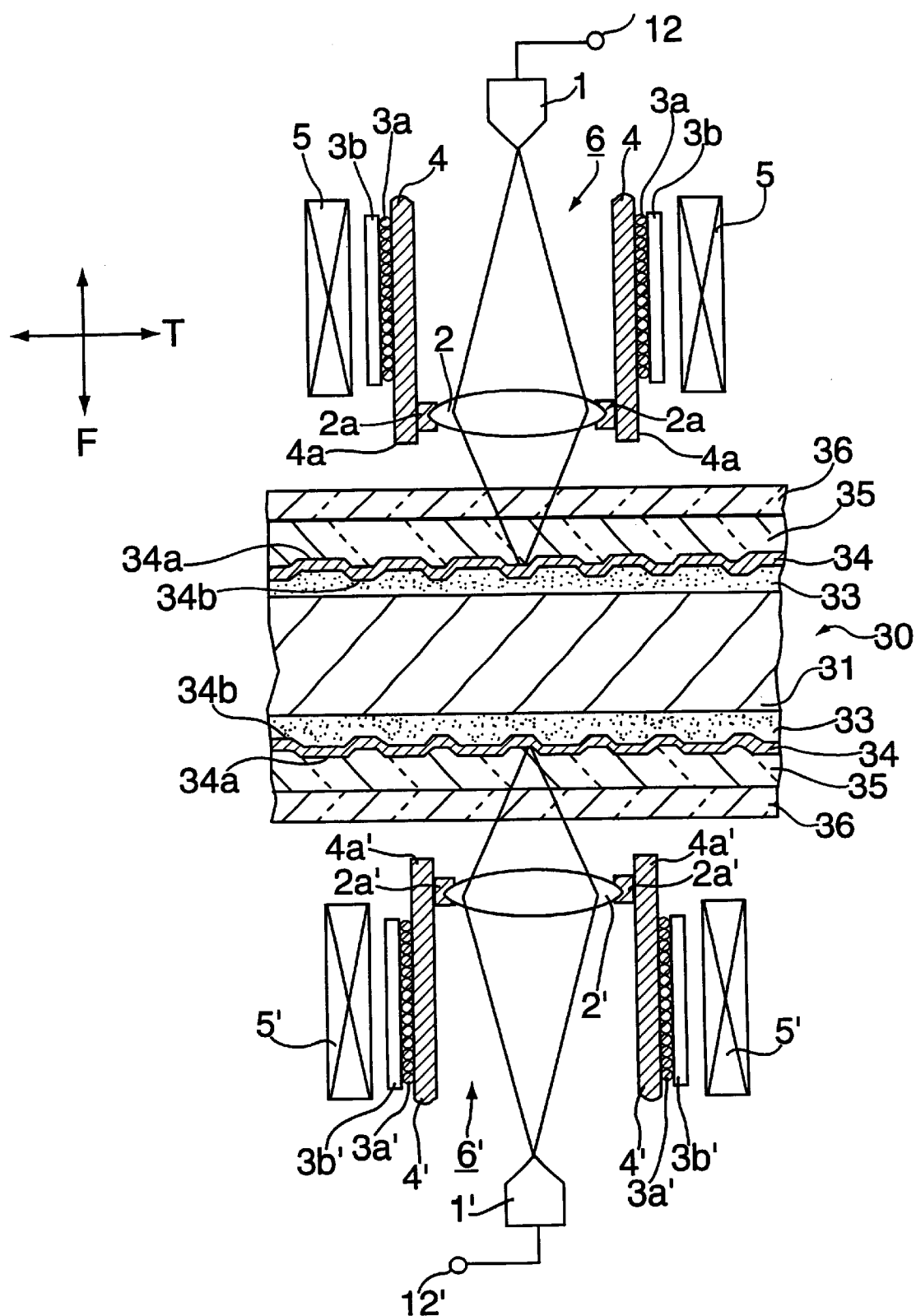
FIG. 4 is a sectional view showing the optical disc system according to a third embodiment of the present invention.

The third embodiment will be described below. In this embodiment, the same optical disc system as illustrated in FIG. 3 is shown in FIG. 4, but recording and reproduction can be performed on the double-sided optical recording medium 30 shown in FIG. 4.

The double-sided optical recording medium 30 was disclosed in the specification and drawings of Japanese Patent Application No. 1-274734 filed by one of the inventors of this application and other persons. In the recording medium 30, a photo-curable resin layer 33, an optical recording layer 34, an adhesive layer 35, and a transparent protective plate 36 are sequentially stacked on each of the surfaces of a single substrate 31. Both the transparent protective plate 36 and the adhesive layer 35 have light-transmitting properties, and a total thickness thereof is 0.6 mm or less.

In the third embodiment, recording on or reproduction from both surfaces of the double-sided optical recording medium 30 can be simultaneously performed. Further, as recording on or reproduction from one surface is performed, recording on or reproduction from the other surface can be also performed.

As described above, in the second and third embodiments, the numerical aperture NA of the objective lens 2, 2' may be increased as in the first embodiment, so that high-density recording and reproduction are possible. At the same time, the double-sided optical recording medium can be used, so that high storage capacity and high-speed recording and reproduction are possible. Thus, a large storage capacity optical disc system can be provided.

Although optical disc systems are disclosed in the first to third embodiments, the present invention is not limited to such systems. The present invention is also applicable to an optical disc system in which recording and/or reproduction are performed on an optical disc having an optical recording medium, including a "write-once-read-many-times"-type optical recording medium that has pits in its recording layer, an optical recording medium having a recording layer in which optical characteristics thereof change when data is recorded thereon, a rewritable-type optical recording medium, and an erasable-type optical recording medium, for example.

According to the optical disc system of the present invention, the NA of the objective lens for focusing the laser beam is increased, and the thickness of the light-transmitting cover of the optical disc is decreased, so that recording and/or reproduction can be performed at a higher density than for a conventional case, and large-capacity recording can be realized.

In the fourth embodiment, the optical disc system is similar to either the second or the third embodiments described above and shown in FIGS. 3 and 4. As shown in FIGS. 3 and 4, the optical recording layers are formed to have land and groove regions which are used to facilitate tracking of the laser beam on the optical recording layer. In FIG. 3, the land and groove regions are shown as reference numerals 16a and 16b, respectively. In FIG. 4, the land and groove regions are shown as reference numerals 34a and 34b, respectively.

In the optical disc system of the fourth embodiment, information is recorded on both the land regions and the groove regions, and the transition or border regions between the land and groove regions are used for tracking. Therefore, the recording density is increased over systems that record only on the land regions or on the groove regions.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. An optical disc comprising:
   a recording layer for recording information thereon and reproducing information therefrom, onto which a laser beam having a wavelength, $\lambda$, that falls within a range from 100 nm to 780 nm is focused using an objective lens having a numerical aperture, NA, that falls within a range of $0.55 \leq NA \leq 1.10$, the recording layer being formed of an optical recording material; and
   a light-transmitting cover layer covering the recording layer and transmitting the laser beam therethrough, the light-transmitting cover layer having a thickness equal to $192 \times \lambda / NA^3$.

2. An optical disc according to claim 1, wherein the optical recording material forming the recording layer has optical characteristics that change when data is recorded thereon.

3. An optical disc according to claim 1, wherein the recording layer is formed of a rewritable-type optical recording material.

4. An optical disc according to claim 1, wherein the recording layer is formed of an erasable-type optical recording material.

5. An optical disc according to claim 1, wherein the recording layer is formed of a write-once-read-many-times-type optical recording material.

6. An optical disc according to claim 1, further comprising supporting means having a surface for supporting the recording layer thereon, the supporting means being formed in a plate-like shape.

7. An optical disc according to claim 6, further comprising interconnecting means for interconnecting the light-transmitting cover layer and the supporting means, wherein the supporting means has a thickness that is substantially the same as the thickness of the light-transmitting cover layer.

8. An optical disc according to claim 1, wherein the recording layer includes land regions and groove regions, and information is recorded on and reproduced from both the land regions and the groove regions.

9. An optical disc according to claim 8, wherein the recording layer further includes transition regions between the land regions and the groove regions, the transition regions being used for a tracking operation with respect to the recording layer.

10. An optical disc system comprising:
    an optical disc having a recording layer and a light-transmitting cover layer, the recording layer for recording data thereon and being formed of a recordable optical recording material, the light-transmitting cover layer for covering the recording layer and transmitting a light beam having a wavelength, $\lambda$, that falls within a range from 100 nm to 780 mm therethrough; and
    an optical pickup including a light source for radiating the light beam to the optical disc and an objective lens for converging the light beam radiated from the light source onto the recording layer through the light-transmitting cover layer, the objective lens having a numerical aperture, NA, that falls within a range of $0.55 \leq NA \leq 1.10$, and the light-transmitting cover layer having a thickness equal to $192 \times \lambda / NA^3$.

11. An optical disc system according to claim 10, wherein the light beam radiated from the light source is modulated according to data being recorded on the optical disc.

12. An optical disc system according to claim 10, wherein the optical pickup further comprises driving means for driving the objective lens in at least a direction to an optical axis of the objective lens.

13. An optical disc according to claim 10, wherein the recording layer includes land regions and groove regions, and information is recorded on and reproduced from both the land regions and the groove regions.

14. An optical disc according to claim 13, wherein the recording layer further includes transition regions between the land regions and the groove regions, the transition regions being used for a tracking operation with respect to the recording layer.

15. An optical recording medium for use in an optical recording and/or reproducing apparatus having a light source for radiating a light beam and an objective lens for converging the light beam along an optical axis thereof, the light beam having a wavelength, $\lambda$, that falls within a range of 100 nm to 780 nm and the objective lens having a numerical aperture, NA, that falls within a range of 0.55 to 1.10, the medium comprising:

a recording layer; and a light beam transmitting cover layer provided on a surface of the recording layer for transmitting the converged light beam to the recording layer, the light beam transmitting cover layer having a thickness equal to $192 \times \lambda/NA^3$.

16. An optical disc according to claim 15, wherein the recording layer includes land regions and groove regions, and information is recorded on and reproduced from both the land regions and the groove regions.

17. An optical disc according to claim 16, wherein the recording layer further includes transition regions between the land regions and the groove regions, the transition regions being used for a tracking operation with respect to the recording layer.

18. An optical disc system for recording and/or reproducing information signals, the system comprising:

a light source for radiating a light beam having a wavelength, $\lambda$, that falls within a range from 100 nm to 780 nm;

an optical disc including a recording layer and a light beam transmitting cover layer provided on a surface of the recording layer and transmitting the light beam therethrough; and an objective lens having a numerical aperture, NA, that falls within a range of $0.55 \leq NA \leq 1.10$ for converging the light beam onto the recording layer through the light beam transmitting cover layer, wherein the light beam transmitting cover layer has a thickness equal to $192 \times \lambda/NA^3$.

\* \* \* \* \*